R. WINKLER.
BORING MACHINE.
APPLICATION FILED NOV. 30, 1908.

922,371.

Patented May 18, 1909.

WITNESSES
Ben. Joffe
Wm. J. Sperl

INVENTOR
Randolph Winkler
BY Munn & Co.
ATTORNEYS

THE NORRIS PETERS CO., WASHINGTON, D. C.

UNITED STATES PATENT OFFICE.

RANDOLPH WINKLER, OF COVINGTON, KENTUCKY.

BORING-MACHINE.

No. 922,371.   Specification of Letters Patent.   Patented May 18, 1909.

Application filed November 30, 1908. Serial No. 465,133.

*To all whom it may concern:*

Be it known that I, RANDOLPH WINKLER, a citizen of the United States, and a resident of Covington, in the county of Kenton and State of Kentucky, have invented a new and Improved Boring-Machine, of which the following is a full, clear, and exact description.

This invention relates to boring machines, and more especially to those which are designed to be used in boring holes in the sills of freight cars and similar locations.

The primary object of the invention is to provide a boring machine which is free from clamps or levers, which would conflict with the brake connections, camber rods and floating levers such as are customary in freight cars.

It is a further object of my invention to provide a boring machine which may be held in position by the knees or legs of an operator sitting underneath the car, thereby enabling him to use both hands to drive the bit, or else use one hand to drive the bit and one to produce lever pressure.

A further object is to provide a boring machine with removable handles and removable pressure-sustaining devices, so that one side of the boring machine may be entirely free from any lateral projections.

The invention consists in the construction and combination of parts to be more fully described hereinafter and defined in the appended claims.

Reference is to be had to the accompanying drawings, forming a part of this specification, in which similar characters of reference indicate corresponding parts in both views, and in which—

Figure 2:
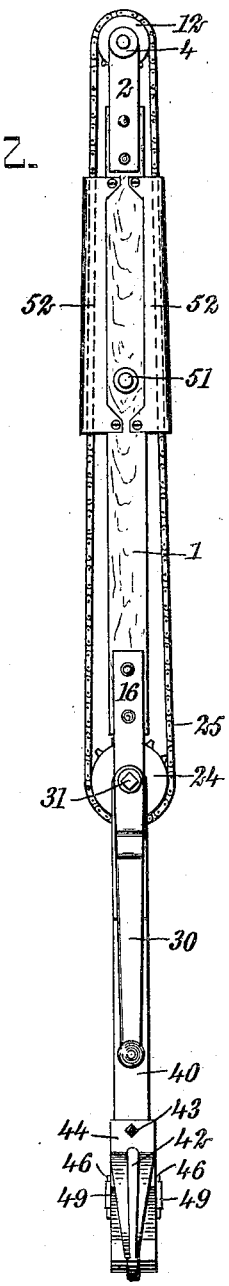
Figure 1:
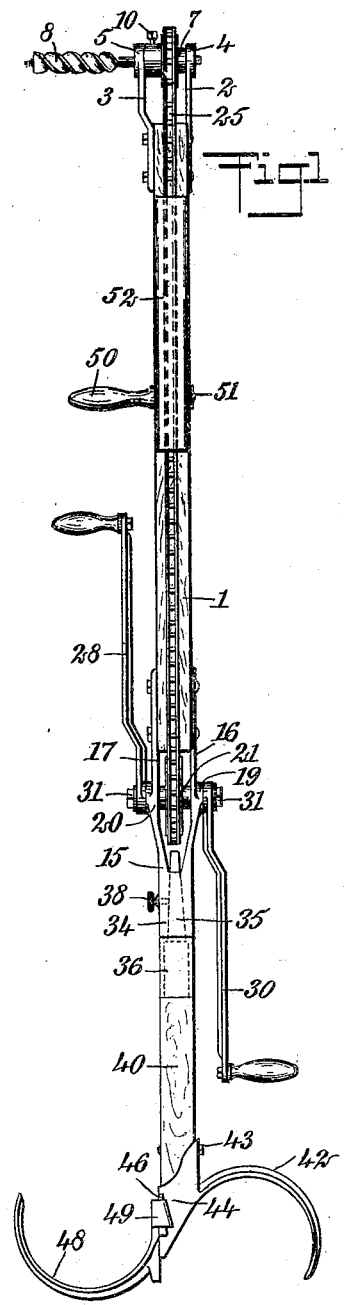

Figure 1 is a side elevation of my improved form of boring machine; and Fig. 2 is a front elevation of the same.

The body of the machine comprises a stem 1, which may be formed of wood or any other desired material. Straps 2 and 3 are bolted to the upper end of the stem 1, and are provided with bosses 4 and 5 respectively, which form journal bearings for a chuck 7. Said chuck is adapted to receive an auger 8, which may be held within the chuck 7 by means of a set-screw 10. It is evident that a drill may be similarly held in place of the auger, if desired. A sprocket wheel 12 is mounted about the chuck 7 and adapted to rotate therewith in order to drive the auger. A yoke 15 having parallel arms 16 and 17, is bolted to the lower end of the stem 1. Said arms are provided intermediate their length with bosses 19 and 20, which form bearings for a driving shaft 21. A sprocket wheel 24 is secured to the shaft 21 and adapted to rotate therewith. A chain 25 passes around the sprocket wheels 12 and 24 and transmits the power from the shaft 12 to the auger 8. Crank handles 28 and 30 are secured to the opposite ends of the driving shaft 21, said handles being removable and held in place by bolts or nuts 31.

The lower end of the yoke 15 is formed with a socket 34, adapted to receive a projection 35 formed on the end of a ferrule 36. Said projection 35 is substantially square in lateral cross section and is maintained within the socket 34 by means of a set screw 38. A bar or rod 40 is secured at its upper end within the ferrule 36. At the lower end of the bar 40 is a laterally-extending hook or pressure-sustaining member 42, which may be fastened to the bar 40 by means of a bolt 43. The socket portion 44 of the hook 42 is provided with a pair of inclined guides 46. The hook or pressure-sustaining member 48 is formed with ears 49, having interior inclined portions adapted to co-act with the guides 46, whereby the hook 48 may be supported from the socket 44. It will be noted that the hook 42 curves upwardly, so that it may be applied to the right knee of the operator, whereas the hook 48 is curved downwardly, and may form a support for the left leg of the operator. By means of these hooks or pressure-sustaining members, the operator may exert pressure to drive the auger laterally.

Intermediate the length of the stem 1 is a removable handle 50, held in position by means of a bolt 51. A pair of chain-guards 52 are fastened upon opposite sides of the stem 1, passing outside of the chain 25. These form a hand-hold and enable the operator to use one hand to draw the body of the boring machine sidewise, in order to cause the auger to enter the article to be bored.

From the construction above set forth, it will be noted that the handle 50, the crank handle 28 and the pressure-sustaining member 48 may be removed, thus leaving the boring machine with one side free of obstructions from the lower end up to the auger. This construction is of great value when the boring machine is to be placed in position and entered between the various rods and obstructions which are present under the body of a freight car. It will also be noted that the boring machine is rendered reversible by this construction. It will also be seen that my boring machine is adapted for use by an operator in stooping position. By removing the member 48 and the crank handle 28 and also releasing the set-screw 38 so that the projection 35 may be withdrawn from the socket 34, said projection may be given a quarter turn and be again inserted in said socket and fastened in position. The machine is then in condition to allow the operator to place the hook 42 against his left arm-pit and steady the machine with his left hand on the handle 50 or upon the chain-guard 52. The crank 30 may then be operated by the right hand. It will also be understood that the auger 8 may be fastened from either side of the machine.

Having thus described my invention, I claim as new and desire to secure by Letters Patent:—

1. A boring machine comprising a body, means at one end of the body for rotatably supporting an auger, a transverse shaft intermediate the length of the body, a connection between said shaft and the auger supporting means for rotating the same, a hook detachably connected with the opposite end of the body, and a second hook detachably connected with the first hook, the hook on the side adjacent to the auger point having its convexed side away from the auger and the other hook having its convexed side toward the auger.

2. In a device of the class described, a body provided with auger supporting means, and with means for rotating the auger, of a hook secured to the body and projecting in the opposite direction from the direction of the auger, the convexed side of the hook being toward the auger, and a second hook detachably connected with the first hook and having its convexed side away from the auger, said hook projecting toward the opposite side of the body from the first hook.

3. In a device of the class described, a body provided with auger supporting means, and with means for rotating the auger, of a hook secured to the body and projecting in the opposite direction from the direction of the auger, the convexed side of the hook being toward the auger, and a second hook connected with the first hook and having its convexed side away from the auger, said hook projecting toward the opposite side of the body from the first hook.

In testimony whereof I have signed my name to this specification in the presence of two subscribing witnesses.

RANDOLPH WINKLER.

Witnesses:
GEORGE C. KOLB,
ROBT. L. ZEIDLER.